HOWARD M. CROW
INVENTOR

HUEBNER, BEEHLER,
WORREL & HERZIG
ATTORNEYS

BY
Richard M. Worrel

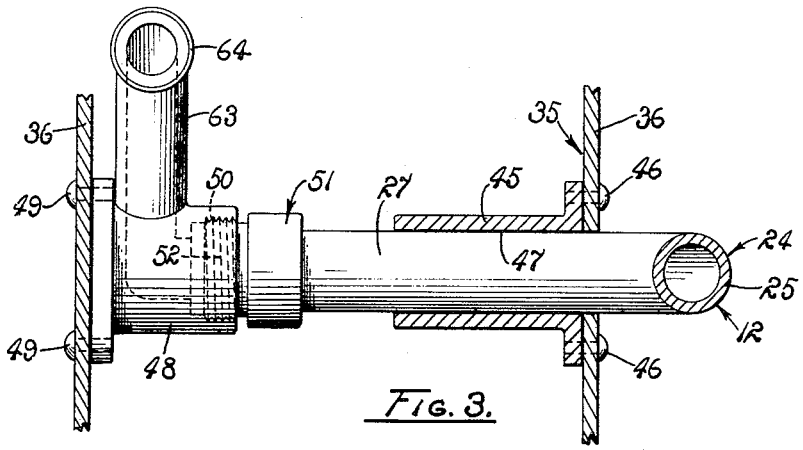
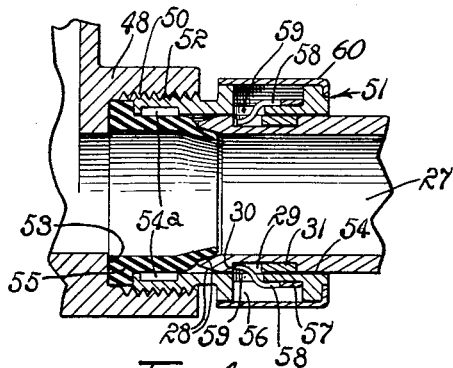
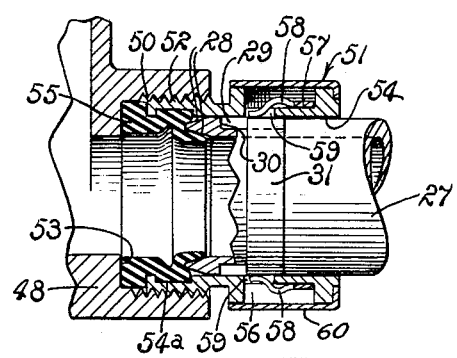
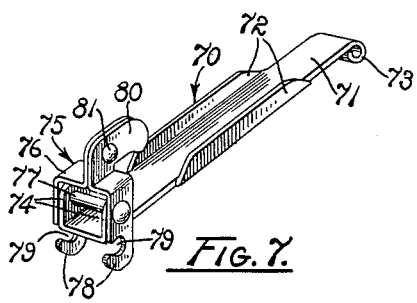
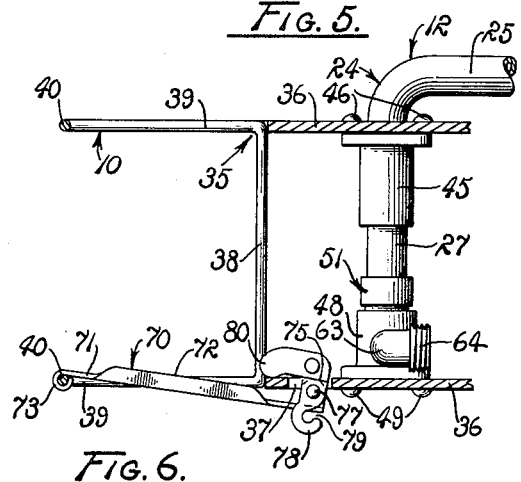

United States Patent Office 2,752,198
Patented June 26, 1956

2,752,198

HOSE REELS

Howard M. Crow, Lindsay, Calif.

Application January 19, 1953, Serial No. 331,967

4 Claims. (Cl. 299—78)

The present invention relates to portable hose reels and more particularly to such a reel having a support member adapted for rigid connection to a faucet, or other source of fluid, and a hose winding spool adapted for connection of a hose thereto and which is speedily and easily attachable for rotation in fluid tight engagement on the support member and detachable therefrom.

Reels for garden hoses mounted in support carts for trundling about a garden have long been known. The practice is to wind a garden hose on such a reel and to convey it by means of the cart to a position of use whereupon it is connected to a faucet. For use, the hose is unwound from the reel and employed as desired. Subsequent to use, it is rewound on the reel, disconnected from the faucet, and moved to a new position of use. Although such cart-borne-reels have been of considerable service, and will continue to be, they are subject to difficulties under certain conditions which the present invention is believed to overcome.

The movement of such cart-borne-reels is frequently more difficult than the simple carrying or rolling of a reel would be in the absence of the cart. Their cost is obviously greater than that of the reel only. Support has been required, however, for reels when connection is effected to a faucet so that winding and unwinding rotation of the reels can be accomplished and thus the carts have heretofore been regarded as necessary adjuncts. Such cart-borne-reels are found to occupy excessive space during irrigation operations and are needlessly expensive.

Experimentation has been conducted involving the releasable mounting of hose reels on faucets so as to be supported by the faucets during rotation. Prior to the present invention, however, the structure required to mount the reels on such faucets has required needlessly extensive connecting and disconnecting operations in order to achieve a structure able to accommodate free reel rotation and yet to effect water tight interconnection.

An object of the present invention is therefore to provide a portable hose reel having a support adapted for rigid connection to a faucet, or other source of fluid, and a hose winding spool adapted for connection of a hose thereto for winding thereon which spool is speedily and easily attachable for rotation in fluid tight engagement on the support and detachable therefrom.

Another object is to provide an improved hose reel which is readily carried and/or rolled between positions of use with a hose wound thereon.

Another object is to provide a hose reel that is simple in structure, light in weight, economical to produce, and thoroughly effective in accomplishing its intended functions.

Another object is to provide a combined carrying handle and hose latching member in a hose reel of the character described.

Further objects and advantages will become apparent in the subsequent description in the specification.

Referring to the drawings:

Fig. 3 is an enlarged fragmentary section through a central portion of the hose reel showing coupling means therefor adapted for quick attachment and detachment of the reel, as taken along line 3—3 in Fig. 1.

Fig. 4 is an enlarged fragmentary axial section of the coupling means as viewed from line 4—4 in Fig. 1, showing the coupling means in reel attaching position.

Fig. 5 is a view similar to Fig. 4 but showing the coupling in reel released position.

Fig. 6 is a fragmentary longitudinal section through the hose reel.

Fig. 7 is a perspective of a retractable handle portion of the reel.

Figures 1, 2:
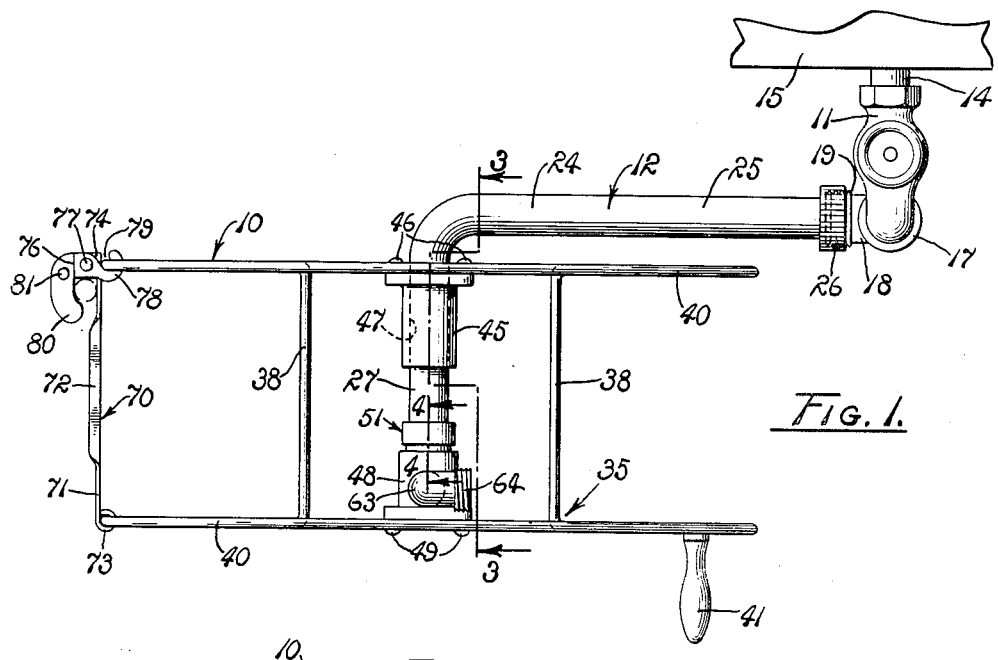
Fig. 1 is a plan view of a hose reel of the present invention mounted in operable position on a faucet.
Fig. 2 is a front elevation of the hose reel shown in Fig. 1.

Referring in greater detail to the drawings:

The hose reel of the present invention is indicated generally by the reference numeral 10 and is adapted to be rotatably supported on a faucet 11, or like rigid source of water or other fluid under pressure by means of a rigid support 12.

The faucet 11 is shown rigidly supported on a pipe 14 extending horizontally from a wall 15, or other supporting structure. A threaded outlet for the faucet threadedly receives a union 17 of an extension elbow 18. The opposite end of the elbow provides a nipple portion to which a rigid support of the reel is removably attached. It will be apparent that the elbow 18 is not an essential part of the device of the present invention but an accessory of convenience in some instances. Obviously the support 12 may be connected directly to a faucet if desired.

The rigid support 12 includes an L-shaped conduit 24 having a longer leg screw-threadedly mounted on the nipple 26 of the elbow rigidly to support the conduit. The conduit has a shorter mounting leg 27 for spool mounting purposes which extends at right angles to the connecting leg 25 and terminates in an internal and external chamfer 28 at its end. The mounting leg provides a cylindrical journal portion inwardly adjacent to the chamfer and an annular groove 29 of rectangular cross section is formed in circumscribing relation in the mounting leg 27 inwardly adjacent to the chamfer. The groove provides an inwardly facing shoulder 30 having a function hereinafter more fully described. An annular release sleeve 31 of less width than the groove 29 is positioned in the groove for axial slidable movement therein and has a periphery flush with the periphery of the mounting leg.

The hose reel employs a spool 35 generally of the form of a flanged cylinder having a pair of circular, axially spaced end plates 36, one of which has a rectangular opening 37 formed therethrough for the purpose hereafter described. The plates are held in spaced relation by a plurality of struts 38 welded to and extending between the plates in equal spaced relation along the periphery of the plates and in generally cylindrical arrangement. Spokes 39 are welded to the plates and extend radially from the plates. The spokes conveniently are continuations of the struts and are welded to circular rims 40 concentric to their respective plates. The struts constitute a generally cylindrical drum of the spool and the spokes and the rims provide end flanges for the spool. A knob 41 or other grip is secured to one of the spokes and extends parallel to the axis of the reel whereby the reel may be manually rotated.

The spool 35 is rotatably mounted on the reel mounting leg 27 of the conduit by providing a bearing 45 concentrically fastened, as at 46, against the inner side of one of the plates 36 and axially disposed therefrom. The bearing 46 has a bore slidably and rotatably fitted to the leg 27 of the conduit. A coupling housing 48 is attached coaxially of the bearing, at 49, to the inner face of the plate opposite the plate to which the bearing is attached. The coupling housing has a female threaded portion 50. A "quick" coupling 51 provides a male threaded portion 52 screw-threadedly mounted in the female portion 50. A water passage extends through the coupling and the coupling housing and provides a radially disposed outlet in the housing. An annular shoulder 53 is provided in the coupling housing in circumscribing relation to the water passage and is disposed toward the coupling 51. A bore 54 in the coupling, constituting a portion of the water passage, is slidably and rotatably fitted to the leg 27 of the conduit. A gasket 55 is mounted within the bore of the coupling and extends into internal engagement with the chamfer 28 of the leg 27 to preclude leakage of liquid therebetween. An inwardly disposed groove 54a is formed in the coupling 54 intermediate the inner end of the conduit 27 and the shoulder 53 in circumscribing relation to the gasket. As shown, the gasket 55 has an enlarged cylindrical end fitted within the coupling housing 48 against the shoulder 53 and between said shoulder and the inner end of the coupling 51. When mounted for use, the enlarged cylindrical end is held under compression between the coupling 51 and the shoulder 53. The gasket provides a cylindrical central portion of a diameter less than the enlarged end which terminates at the end of the gasket opposite to the enlarged end with an inwardly and endwardly tapered periphery adapted for sealing engagement against the inner chamfer 28. The gasket is formed of any suitable resiliently compressible material, such as rubber, plastic, or the like.

An annular recess 56, transversely of rectangular form, is provided externally in the coupling with an annular ring 57 slidably mounted in the recess. A plurality of spring fingers 58 are mounted on the ring and extend generally in the direction of the coupling housing therefrom. A like plurality of openings 59 are formed radially through the coupling from the recess 56 in positions adjacent to the edge of the recess adjacent to the coupling housing. The spring fingers not only extend axially from their sleeve but also extend inwardly through the openings 59 into the bore 54 of the coupling and provide inner ends engageable with the coupling at the side of the groove 29 adjacent to the shoulder 30 of the conduit 27 to preclude inadvertent disassociation of the conduit from the coupling. A cover 60 is press fit to the coupling in overlying relation to the recess 56 and in fluid tight relation on the coupling.

As shown in Fig. 4 of the drawings, when the journal portion of the reel mounting leg 27 of the conduit is inserted into the coupling, the chamfer cams the spring fingers outwardly to the peripheral surface of the mounting leg. Further inward movement of the leg, causes the fingers to spring into the annular groove 29 between the release ring 31 and the shoulder 30. The spool 35 is thus rotatably attached to the conduit with the ends of the fingers extended into the groove 29 and releasably preventing separation of the reel mounting leg and the coupling. So held, the gasket 53 is maintained in fluid tight engagement with the inner chamfer 28 and with the enlarged end thereof under substantially fluid tight compression between the coupling 51 and the shoulder 53. The resultant endward compression of the gasket also causes the same slightly radially to expand against the inside of the coupling with the engagement of the periphery of the gasket against the edges of the groove 54a being of further sealing effect.

The spool 35 is removed from the conduit 14 by forcing the spool and coupling 51 further onto the leg. As shown in Fig. 5, this movement is accommodated by buckling of the gasket into the groove 54a. This movement causes the spring fingers 58 to be cammed onto the periphery of the release sleeve 31. The spool and coupling are then moved axially away from the coupling leg of the conduit. During this operation the release sleeve slides with the spring fingers, being frictionally engaged thereby. Continued outward axial movement of the spool causes the release sleeve to slide against the shoulder 30 and the spring fingers to slide from the release sleeve onto the outer surface of the conduit whereby the reel may be entirely removed from the conduit.

An extension 63 projects substantially radially from the coupling housing 48. The water passage continues through the extension, as shown. The extension terminates in a male nipple 64 whereby a hose 65 may be attached to the extension in the well known manner and wound on the drum portion of the spool 35 by spool rotation.

The spool 35 is provided with a handle 70 so that the spool may be easily carried when it is removed from the rigid support 12 and the hose 65 held in coiled position thereon. The handle is made in the form of an elongated strap 71 having longitudinal reinforcing lips 72 extending perpendicularly from its side edges to preclude bending of the handle while the spool is carried thereby. An eye 73 is formed in one end of the handle which circumscribes a portion of a rim 40 of the spool rotatably mounting the handle whereby it is movable to a position spanning the rims and a position pivoted outwardly against one end of the spool. A pair of ears 74 extend perpendicularly from the handle at its end opposite to the eye. A hook 75 is pivotally mounted on the ears 74 by forming the hook with a bifurcated yoke 76 which straddles the ears. A pintle 77 passes through the yoke and the ears. The yoke extends from the handle oppositely of the ears in a pair of spaced hooks 78 each formed with a hook slot 79 therein. The hook extends from the yoke oppositely of the hook legs in a lever 80 formed by overlying portions of the hook riveted together at 81.

The handle 70 is movable either across the rims 40 for use as a handle, as shown in Figs. 1 and 2, or pivoted against the outer face of the spool to an out-of-the-way position, shown in Fig. 6, while a hose is reeled onto, or from, the spool. When the handle is in position spanning the rims of the spool, the hook 76 is pivoted on the handle to engage the hook slots 79 of the hook with the rim of the reel opposite the rim on which the handle is mounted. In this position of the handle, the spool may be easily and conveniently carried after removal from the rigid support 12. To pivot the handle to its out-of-the-way position, the hook 75 is pivoted to release the hook slots 79 from the rim of the spool. The handle is thereafter pivoted to the position shown in Fig. 6 of the drawing against the outer face of the spool. The handle is maintained in such position by inserting the lever portion 80 of the hook into the rectangular opening 37 in the end plate of the spool and rotating the lever to the position shown. As shown in Figs. 1 and 2, the end of the hose or a nozzle thereon may be held between the handle and the lever portion of the hook when the handle is in carrying position to constrain the hose to rolled condition on the spool.

Operation

The operation and utility of the present invention are believed to be apparent and are brefly summarized at this point. The conduit 24 is attached to a faucet 11 or other source of liquid as by attaching the elbow 18 thereto. In normal garden use, a conduit 24 is attached to each faucet where it is intended that a hose be used, with the coupling leg 27 of each conduit substantially horizontally extended. The spool 35 is rotatably mounted on a mounting leg 27 by passing the bore 47 of the bearing 45 over the outer end of the mounting leg. The spool is moved onto the leg of the conduit until the outer end of the leg enters the coupling 50 to an extent sufficient that the ends of the fingers 58 spring inwardly into the annular groove 29 between the shoulder 30 and the release sleeve 31. The ends of the spring fingers engage the shoulder and prevent inadvertent removal of the spool from the conduit while rotatably supporting the same thereon.

With the spool 35 thus mounted and with the handle 70 in its withdrawn position against the end of the spool, a hose is attached to the nipple 64 of the extension 63 and the hose wound onto the spool by rotation of the spool by the knob 41.

In use, the hose 65 may readily be pulled from the spool 35, as convenience suggests. It will be obvious, that as the hose is pulled from the spool, the spool rotates on the leg 27 on which it is supported by the bearing 45. When the faucet 11 is opened, water flows through the L-shaped conduit 24, passes through the coupling 51 into the coupling housing 48, and thence through the extension 63 into the hose. The spool, coupling housing, and coupling rotate freely on the leg 27 while the gasket 53 precludes water leakage, as described.

When it is desired to use the hose 65 in a different location, the faucet 11 is closed and the spool 35 is rotated by means of the knob 41 to roll the hose onto the spool. The handle 70 is connected between the rims 40 in overlying relation to the coiled hose, as shown in Fig. 2 and previously described, and the end of the hose inserted between the handle 70 and the lever 80.

With the hose 62 thus compactly stowed on the spool 35, the spool is thrust inwardly on the leg 27 to cause the fingers 58 to ride upwardly onto the periphery of the sleeve 57, subsequent to which the spool is drawn outwardly from the leg 27.

It is worthy of note that the bearing 45 provides rotational support for the spool 35 on the leg 27 during use. The axial alignment of the bearing and the coupling 51 facilitates the guided insertion of the leg into the coupling for speedy and convenient installation of the spool on the leg. With the weight of the spool and hose borne by the bearing, the coupling is shielded from inadvertent damage thereto and serves simply to provide convenient liquid seal between the coupling housing and the leg which is speedily and easily connected and disconnected.

The spool may be carried between places of use by means of the handle 70, or rolled if preferred, and reinstalled by sliding the bearing 45 over the horizontal leg 27 of a selected conduit 24 in a desired area of use and seating the extended end of the leg into the coupling 51, as previously described.

The device of the present invention is economical to produce, durable, and convenient to employ; the movement of a hose from place to place is facilitated and the connection and disconnection of the hose to a source of liquid expediently accomplished.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a portable hose reel assembly the combination of a hose spool comprising a pair of substantially circular parallel end plates, cylindrically arranged parallel struts interconnecting the end plates in fixed spaced relation, spokes radially extended from the plates, and rims mounted on the spokes concentrically of their respective end plates; a bearing mounted concentrically of one of the end plates; a conduit having an end adapted for rigid connection to a faucet and an opposite journal end portion slidably and rotatably extended inwardly through the bearing and its end plate; a coupling mounted concentrically in the end plate opposite to the bearing and having a bore therein coaxially aligned with the bearing rotatably and slidably fitted to the inwardly extended end of the journal portion of the conduit; hose connecting means mounted in the spool having fluid connection to the coupling and having an end extended between the struts of the spool adapted for connection of a hose thereto; a gasket in fluid tight compression between the inner end of the journal portion of the conduit and the hose connecting means; a handle mounted on a rim for pivotal movement between a retracted position pivoted outwardly against an end plate of the spool and an operable position extended between the rims; and a latch mounted on the handle having a hook end adapted for releasable connection with the rim opposite to that on which the handle is mounted and an opposite lever end adapted to lock against the handle end of a hose fastened to the connecting means and wound on the spool when the hook end of the latch is in rim connection.

2. A portable hose reel assembly comprising a substantially L-shaped conduit having a coupling leg adapted for connection to a source of fluid under pressure and a reel mounting leg in substantially right angular relation thereto having a cylindrical journal portion terminating in an inner and an outer chamfer and having an annular groove in circumscribing relation to the journal portion adjacent to the chamfer, a sleeve mounted in the groove of the journal portion for slidable movement axially thereof having a periphery flush with the journal portion, a hose spool having a drum portion providing radially disposed flanges at opposite ends thereof, a bearing secured concentrically in one end of the spool slidably and rotatably fitted to the journal portion of the conduit, a coupling mounted concentrically in the end of the spool opposite to the bearing in axial alignment with the bearing having a bore therein slidably and rotatably fitted to the journal portion of the conduit, the coupling having a circumscribing groove therein and a plurality of openings from the groove into the bore, a ring mounted in the groove for axial slidable movement therein, a plurality of spring fingers mounted on the ring and extended therefrom through the openings for releasable engagement in the groove of the journal portion of the conduit, means connected to the coupling adapted for connection with a hose wound on the spool, and a gasket mounted within the coupling for fluid tight compression between the chamfer of the journal portion and the hose connecting means.

3. A portable hose reel assembly comprising an L-shaped conduit having a coupling leg and a mounting leg with the coupling leg being adapted for rigid attachment to a faucet, the mounting leg terminating in a chamfer with an annular groove provided inwardly adjacent thereto, an annular release ring of less width than the groove located in the groove and axially slidable therein, said ring having a periphery flush with the periphery of the mounting leg, a hose spool having a drum portion providing radial flanges at each of its ends, a bearing secured concentrically in one end of the spool having the reel mounting leg of the conduit journaled therein, a coupler housing secured internally of the opposite end of the cylindrical portion of the spool from the bearing having a threaded opening axially aligned with the bearing, a releasable coupler screw-threadedly mounted in the opening of the coupler housing and having a cylindrical opening coaxially of the bearing slidably fitted over the terminal end of the mounting leg of the conduit and the release ring, the releasable coupler having a circumscribing annular groove and a plurality of openings from the annular groove into the opening in the coupler, a cover fitted over the annular groove in the coupling in fluid tight relation thereon, a plurality of spring fingers extended axially from the ring in a direction opposite to the bearing and inwardly through the openings in the coupler engageable with the groove in the mounting leg, a gasket mounted under compression between the chamfer of the mounting leg and the coupler housing, and an extension on the coupler housing in fluid communication with the opening in the coupler disposed between the flanges of the spool adapted for connection of a hose thereto.

4. A portable hose reel assembly comprising a substantially L-shaped conduit having a leg adapted for rigid connection to a faucet and a spool mounting leg substantially right angularly extended from the connecting leg, the spool mounting leg having a substantially cylindrical journal portion providing a circumscribing groove defined at one side by an annular shoulder in spaced adjacent relation to the extended end of the mounting leg, a sleeve mounted in the groove for axial slidable movement toward and from the shoulder having a periphery flush with the periphery of the journal portion of the mounting leg, a hose spool, an elongated bearing mounted concentrically in an end of the spool slidably and rotatably fitted to the journal portion of the mounting leg, a coupler mounted concentrically in the end of the spool opposite to the bearing having a bore therein in axial alignment with the bearing slidably and rotatably fitted to the journal portion of the mounting leg, the coupler having a peripherally circumscribing groove and a plurality of openings from the groove to the bore adjacent to the edge of the groove opposite to the bearing, a ring mounted in the groove of the coupler for axial slidable movement therein, a plurality of spring fingers mounted on the ring and extended obliquely axially thereof through the openings in the coupler for engagement with the shoulder of the journal portion of the mounting leg, a cover sleeve fitted over the groove of the coupler in fluid tight engagement with the coupler, fluid conducting means connected to the coupler having a seat disposed toward the coupler and an extended end adapted for connection of a hose thereto, and a gasket mounted under substantially water tight compression in the coupler between the extended end of the mounting leg and the seat in the fluid conducting means.

References Cited in the file of this patent

UNITED STATES PATENTS

| | | |
|---|---|---|
| 1,663,410 | Larson | Mar. 20, 1928 |
| 2,312,528 | Davis | Mar. 2, 1943 |
| 2,313,557 | Krenke | Mar. 9, 1943 |
| 2,609,231 | Crawford | Sept. 2, 1952 |
| 2,615,755 | Crawford | Oct. 28, 1952 |
| 2,642,312 | Shine | June 16, 1953 |